United States Patent
Frangakis et al.

(10) Patent No.: US 11,751,517 B1
(45) Date of Patent: Sep. 12, 2023

(54) TREE AND/OR AGRICULTURAL SAPLING PROTECTOR

(71) Applicant: Reynolds Services, Inc., Greenville, PA (US)

(72) Inventors: John R. Frangakis, Hermitage, PA (US); Alan Mickle, Ball Ground, GA (US); George Silagyi, Bel Air, MD (US); Brandy Hammerschmidt, Greenville, PA (US)

(73) Assignee: Reynolds Services, Inc., Greenville, PA (US)

( * ) Notice: Subject to any disclaimer, the term of this patent is extended or adjusted under 35 U.S.C. 154(b) by 1085 days.

(21) Appl. No.: 15/900,012

(22) Filed: Feb. 20, 2018

Related U.S. Application Data

(60) Provisional application No. 62/461,340, filed on Feb. 21, 2017.

(51) Int. Cl.
   *A01G 13/02* (2006.01)

(52) U.S. Cl.
   CPC ..... *A01G 13/0243* (2013.01); *A01G 13/0237* (2013.01)

(58) Field of Classification Search
   CPC ........... A01G 13/0237; A01G 13/0243; A01G 13/10; A01G 13/04
   See application file for complete search history.

(56) References Cited

U.S. PATENT DOCUMENTS

| | | | | |
|---|---|---|---|---|
| 369,616 | A * | 9/1887 | Hetrick | A01G 13/0243 47/32.4 |
| 514,306 | A * | 2/1894 | Clines | A01G 13/0243 47/32.4 |
| 602,941 | A * | 4/1898 | Harvey | A01G 13/0243 47/32.4 |
| 605,776 | A * | 6/1898 | Braden | A01G 13/0243 47/32.4 |
| 1,025,073 | A * | 4/1912 | Ragan | A01G 13/0243 47/30 |

(Continued)

FOREIGN PATENT DOCUMENTS

| | | | | |
|---|---|---|---|---|
| CA | 2212603 | A1 * | 3/1998 | ......... A01G 13/0243 |
| EP | 0230767 | A1 * | 8/1987 | ......... A01G 13/0243 |

(Continued)

*Primary Examiner* — Magdalena Topolski
(74) *Attorney, Agent, or Firm* — Vorys, Sater, Seymour and Pease LLP

(57) ABSTRACT

A sapling protector having a truncated cone-shaped metal tube formed from a flexible electrolytic tinplate and/or electrolytic chromium coated steel metal sheet is provided. The sapling protector also includes at least one fastener and is perforated with a plurality of holes. The truncated cone-shaped metal tube of the sapling protector also has a coating on the outer surface of the metal sheet and the edges of the metal sheet are hemmed so as to limit the presence of sharp edges and provide a safe device. The sapling is recyclable, ecofriendly, reusable, and safe; it may be used for multiple growing seasons; and may be transferable between new saplings over the course of multiple years. The corresponding method of protecting a tree sapling and sapling protector kit are also provided.

19 Claims, 3 Drawing Sheets

(56) References Cited

U.S. PATENT DOCUMENTS

| | | | | |
|---|---|---|---|---|
| 1,704,801 A * | 3/1929 | Miller | ................ | A01G 13/0243 47/30 |
| 3,816,959 A * | 6/1974 | Nalle, Jr. | ........... | A01G 13/0243 47/32.4 |
| 4,268,992 A * | 5/1981 | Scharf, Sr. | ......... | A01G 13/0243 47/21.1 |
| 4,700,507 A * | 10/1987 | Allen | ................ | A01G 13/0243 47/32.4 |
| 4,711,051 A * | 12/1987 | Fujimoto | ............... | A01G 13/04 47/29.2 |
| 4,980,991 A * | 1/1991 | Kipnees | ............. | A01G 13/0237 47/2 |
| 4,995,192 A * | 2/1991 | DeWid | ............... | A01G 13/0237 47/20.1 |
| 5,222,325 A * | 6/1993 | Angus | ................ | A01G 13/0225 135/100 |
| 5,323,566 A * | 6/1994 | Mills | ...................... | A01G 13/10 47/30 |
| 5,479,741 A * | 1/1996 | Underwood | ....... | A01G 13/0237 24/20 EE |
| 5,813,170 A * | 9/1998 | Friesner | ................ | A01G 13/04 47/30 |
| 6,067,747 A * | 5/2000 | Reed | ................... | A01G 13/0243 47/29.1 |
| 2003/0140554 A1* | 7/2003 | Whitcomb | ......... | A01G 13/0237 47/32.4 |
| 2009/0277081 A1* | 11/2009 | Georges | ................. | A01G 13/04 47/6 |
| 2010/0299993 A1* | 12/2010 | Lais | .................... | A01G 13/0243 47/29.4 |
| 2011/0258923 A1* | 10/2011 | Lais | .................... | A01G 13/0243 47/32.6 |
| 2016/0278306 A1* | 9/2016 | Lolio, Jr. | ................ | E02D 31/06 |
| 2018/0084739 A1* | 3/2018 | Bottari | ............... | A01G 13/0237 |
| 2018/0332779 A1* | 11/2018 | Reach | ................ | A01G 13/0237 |

FOREIGN PATENT DOCUMENTS

| | | | | |
|---|---|---|---|---|
| FR | 2785498 A1 * | 5/2000 | ......... | A01G 13/0243 |
| GB | 2258797 | * | 2/1993 | |
| WO | WO-9303603 A1 * | 3/1993 | ......... | A01G 13/0243 |

* cited by examiner

TREE AND/OR AGRICULTURAL SAPLING PROTECTOR

BACKGROUND OF THE INVENTION

Field of the Invention

This invention in general relates to tree and/or agricultural sapling protectors, useful in agriculture for protecting new and young trees from damage and to foster their growth. More specifically, the invention relates to metal sapling protectors, which are eco-friendly, recyclable, reusable, and safe.

Description of Related Art

Sapling protectors, also called growth tube or tree tubes, are used to protect new and young trees and/or plants from damage caused by foraging animals, such as rabbits, rodents and deer. Most existing sapling protectors on the market are made of plastic and/or similar materials. They may be useful for retaining water vapor, thereby increasing the humidity near the tree and/or plant to create a favorable sheltered growing climate inside the sapling protector. These sapling protectors may also raise the temperature of the sheltered climate around the young tree and/or plant, which may protect the tree and/or plant from early spring cold spells, lengthen the growing season and increase the rate of growth.

There are different types of sapling protectors made from various plastics. For example, one type of plastic sapling protector consists of a single-walled grow tube, which can also be simply described as a sheet of plastic wrapped into a cylindrical shape. Another type of plastic sapling protector consists of a two-walled design which adds a softer inner layer to the plastic tube in order to minimize damage caused to the sapling by tube contact. A third type also includes the two-walled design but provides both opaque layers in order to improve light conditions within the tube.

However, plastic growth tubes currently used on the market are neither reusable nor recyclable. These plastic tubes must either be cut from the trees in order to be removed or are made of biodegradable plastic, which degrades too quickly to be used for a second season. For example, many current plastic tubes in use are non-recyclable and usually only last from one to three growing seasons. In addition, some of these tubes have a single line of perforations and allow the tube to break apart as the tree grows and therefore is also for one time use. As a result, tremendous amounts of waste and/or a large biological footprint result from the use of these plastic growth tubes.

Accordingly, there is a need for a suitable alternative to plastic sapling protectors. In this context, metal sapling protectors provide a recyclable, eco-friendly alternative for sapling grow tubes in order to decrease material waste from disposable plastic sapling tubes currently in the agriculture market. In this context, metal sapling protectors may last for multiple growing seasons and may be transferable between new saplings over the course of multiple years. In addition, metal sapling protectors are recyclable in the event that the tube degrades after multiple uses. Therefore, recyclable, ecofriendly, reusable, and safe metal sapling protectors that enhance sustainability while minimizing environmental impact are desirable.

BRIEF SUMMARY OF THE INVENTION

This invention provides a sapling protector having a truncated cone-shaped metal tube. The truncated cone-shaped metal tube has a first and second ends and a longitudinally extending axis and is open at both ends. In addition, the truncated cone-shaped metal tube is such that the diameter of the opening of the first end is larger than the diameter of the opening of the second end of the tube. In the sapling protector of the present invention, the tube is formed from a flexible metal sheet. The metal sheet includes a first and second transverse edges and a first and second longitudinal edges such that the metal sheet forms the truncated cone-shaped metal tube when the first longitudinal edge is joined to the second longitudinal edge. Furthermore, the sapling protector of the present invention includes at least one fastener securing the first and second longitudinal edges of the metal sheet to form the truncated cone-shaped tube. In the sapling protector of the present invention, the flexible metal sheet comprises electrolytic tinplate and/or electrolytic chromium coated steel. Additionally, the truncated cone-shaped metal tube includes a plurality of perforations. Further, the truncated cone-shaped metal tube has a coating on the outer surface of the metal sheet and the longitudinal edges and transverse edges of the metal sheet are hemmed.

This invention also provides for a method of protecting a tree sapling. The method of the present invention includes the step of providing a flexible metal sheet, wherein the flexible metal sheet comprises electrolytic tinplate and/or electrolytic chromium coated steel. The metal sheet comprises a first and second transverse edges and a first and second longitudinal edges. In addition, the longitudinal edges and transverse edges of the metal sheet are hemmed. The method of the present invention also includes the steps of providing at least one fastener and fastening with the at least one fastener the first longitudinal edge of the sheet to the second longitudinal edge of the sheet to form a truncated cone-shaped metal tube. According to the method of the present invention, the truncated cone-shaped metal tube is open at both ends and the diameter of the opening of the first end is larger than the diameter of the opening of the second end of the tube. Additionally, the truncated cone-shaped metal tube includes a plurality of perforations, and the truncated cone-shaped metal tube has a coating on the outer surface of the metal sheet.

This invention also provides a sapling protector kit for providing stable growth conditions to a sapling. The kit of the present invention includes a flexible electrolytic tinplate and/or electrolytic chromium coated steel sheet having a first and second transverse hemmed edges and a first and second longitudinal hemmed edges. In addition, the kit of the present invention has at least one fastener to fasten the first longitudinal hemmed edge of the sheet to the second longitudinal hemmed edge of the sheet to form a truncated cone-shaped metal tube. Furthermore, the kit of the present invention may optionally include a support. In the kit of the present invention, the truncated cone-shaped metal tube is open at both ends and the diameter of the opening of the first end is larger than the diameter of the opening of the second end of the tube. The truncated cone-shaped metal tube also has a plurality of perforations to provide airflow and light to the sapling and the truncated cone-shaped metal tube has a coating on the outer surface of the metal sheet.

An object of this invention is to provide a sapling protector that is recyclable, ecofriendly, reusable, and safe, which may be used for multiple growing seasons, may be transferable between new saplings over the course of multiple years, and, at the same time, which enhance sustainability while minimizing environmental impact. The corresponding method of protecting a tree sapling and sapling protector kit are also provided.

DETAILED DESCRIPTION

Figure 1:
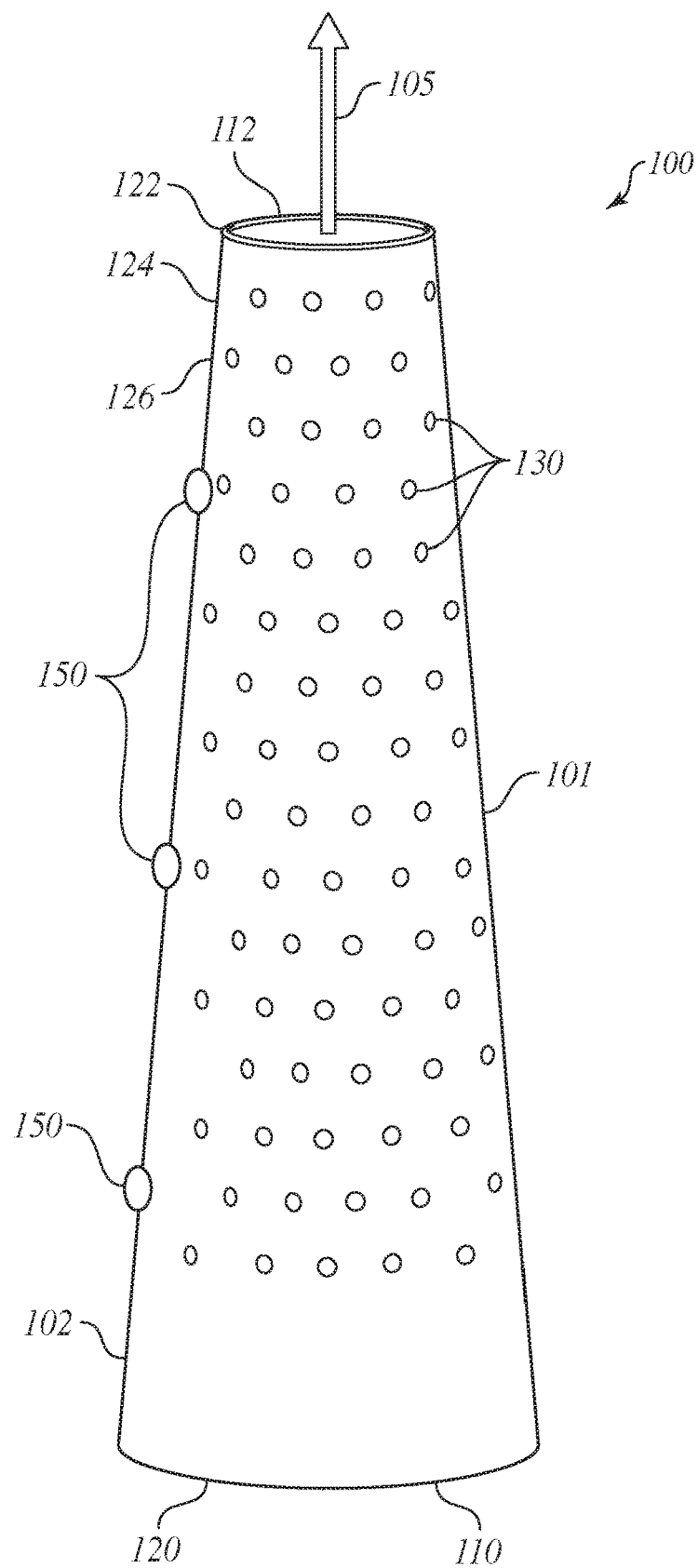
FIG. 1 is a side view of a sapling protector having truncated cone-shaped metal tube made from a flexible metal sheet with hemmed edges and perforations on the surface of the truncated cone-shaped metal tube.

FIG. 1 shows a sapling protector 100 having a truncated cone-shaped metal tube 101. The truncated cone-shaped metal tube has a first end 110 and a second end 112 and a longitudinally extending axis 105 and is open at both ends. In addition, the truncated cone-shaped metal tube is such that the diameter of the opening of the first end 110 is larger than the diameter of the opening of the second end 112 of the tube. In FIG. 1, is also illustrated how in the sapling protector of the present invention, the truncated cone-shaped metal tube is formed from a flexible metal sheet 102. The metal sheet includes a first transverse edge 120 and a second transverse edge 122 and a first longitudinal edge 124 and a second longitudinal edge 126 such that the metal sheet 102 forms the truncated cone-shaped metal tube 101 when the first longitudinal edge 124 is joined to the second longitudinal edge 126. Additionally, the truncated cone-shaped metal tube may include a plurality of air slots and/or perforations 130, in order, for example, to keep the temperature within the tube controlled. Further, the truncated cone-shaped metal tube may have a coating on the outer surface of the metal sheet. Non limiting examples of the sapling protector provide for a sapling protector having a heat-reflective coating. Alternatively and/or additionally, non-limiting examples of the sapling protector provide for a sapling protector having a corrosion inhibitor coating. Furthermore, the longitudinal edges 124 and 126 and transverse edges 120 and 122 of the metal sheet forming the sapling protector may be hemmed and/or folded over and/or bend over in order, for example, to provide a safe product without sharp edges, as illustrated on FIG. 1. As an alternative, when hemming is not possible, the edges may be blunted with a file and/or any appropriate tool.

In the sapling protector of the present invention, one or more fasteners 150 secure the first and second longitudinal edges of the metal sheet to form the truncated cone-shaped tube. The fasteners may be inserted through holes and/or perforations in the flexible metal sheet, the perforations and/or holes used for fastening being located near or close to the longitudinal edges of the sheet. The fastener(s) may be any suitable fastener or latching mechanisms including, for example, zip ties, such as plastic zip ties. The sapling protector of the present invention may be a free standing structure as shown in FIG. 1.

Figure 2:
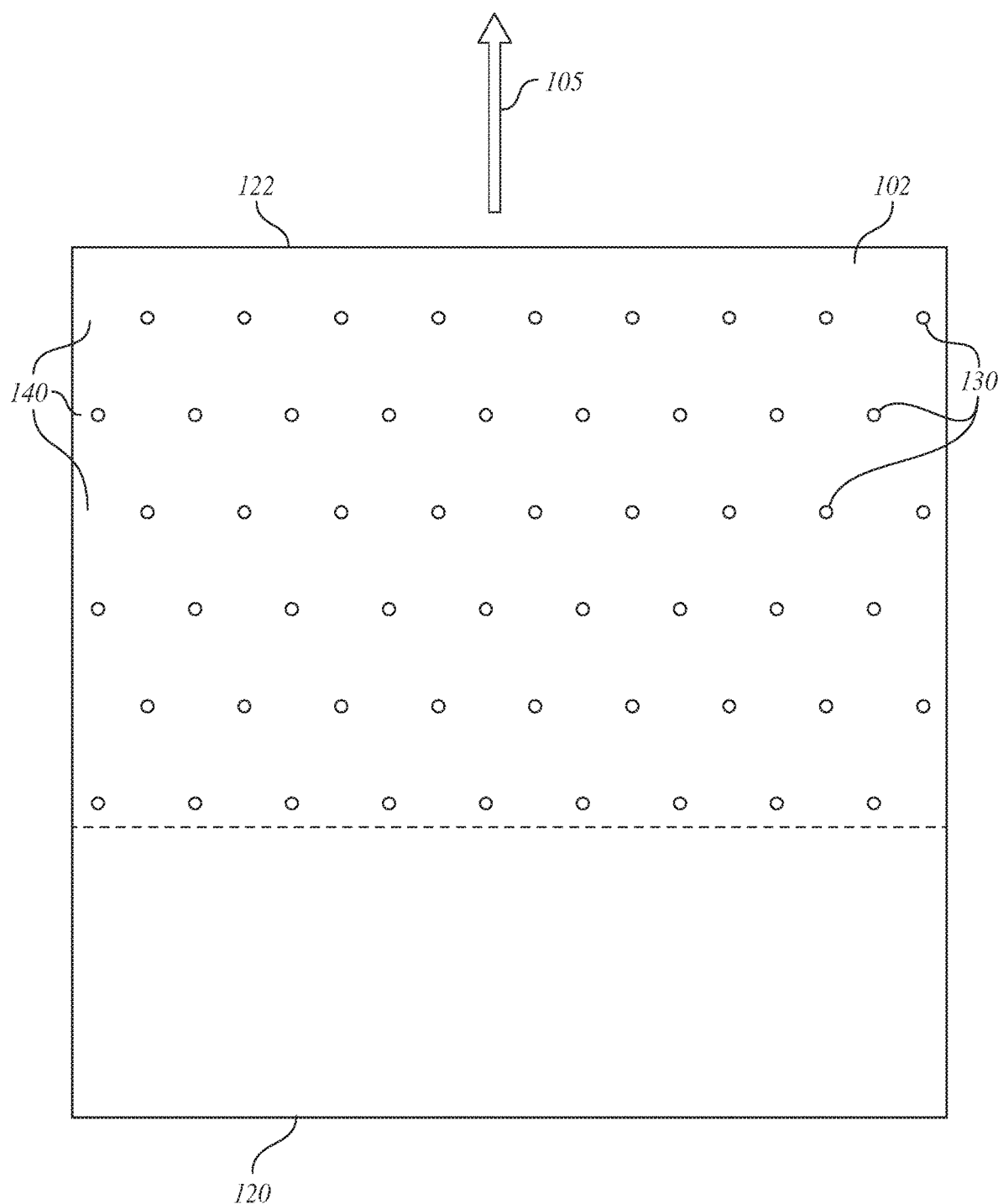
FIG. 2 is a partial top view of a portion of the flexible metal sheet of the sapling protector of FIG. 1 illustrating an example of the perforation pattern.

FIG. 2 shows a partial view showing an example of the pattern of the plurality of perforations on the flexible metal sheet 102 forming the surface of the sapling protector 100 of FIG. 1. To prevent rodents and pesticides from harming the sapling, the tube may be partially closed off such that no perforations will be closer than six (6) inches from the ground. Accordingly, in the pattern shown in FIG. 2, the plurality of perforations 130 are located on an area of the truncated cone-shaped metal tube about 6 inches above the first transverse edge 120, which forms the first end of the resulting truncated cone-shaped metal tube 101 of FIG. 1. In addition, the plurality of perforations includes a plurality of rows of holes 140, such that the row of holes are staggered along the longitudinally extending axis 105 and the holes are separated by about 2 inches from each other throughout the perforated surface area of the flexible metal sheet.

Figure 3:
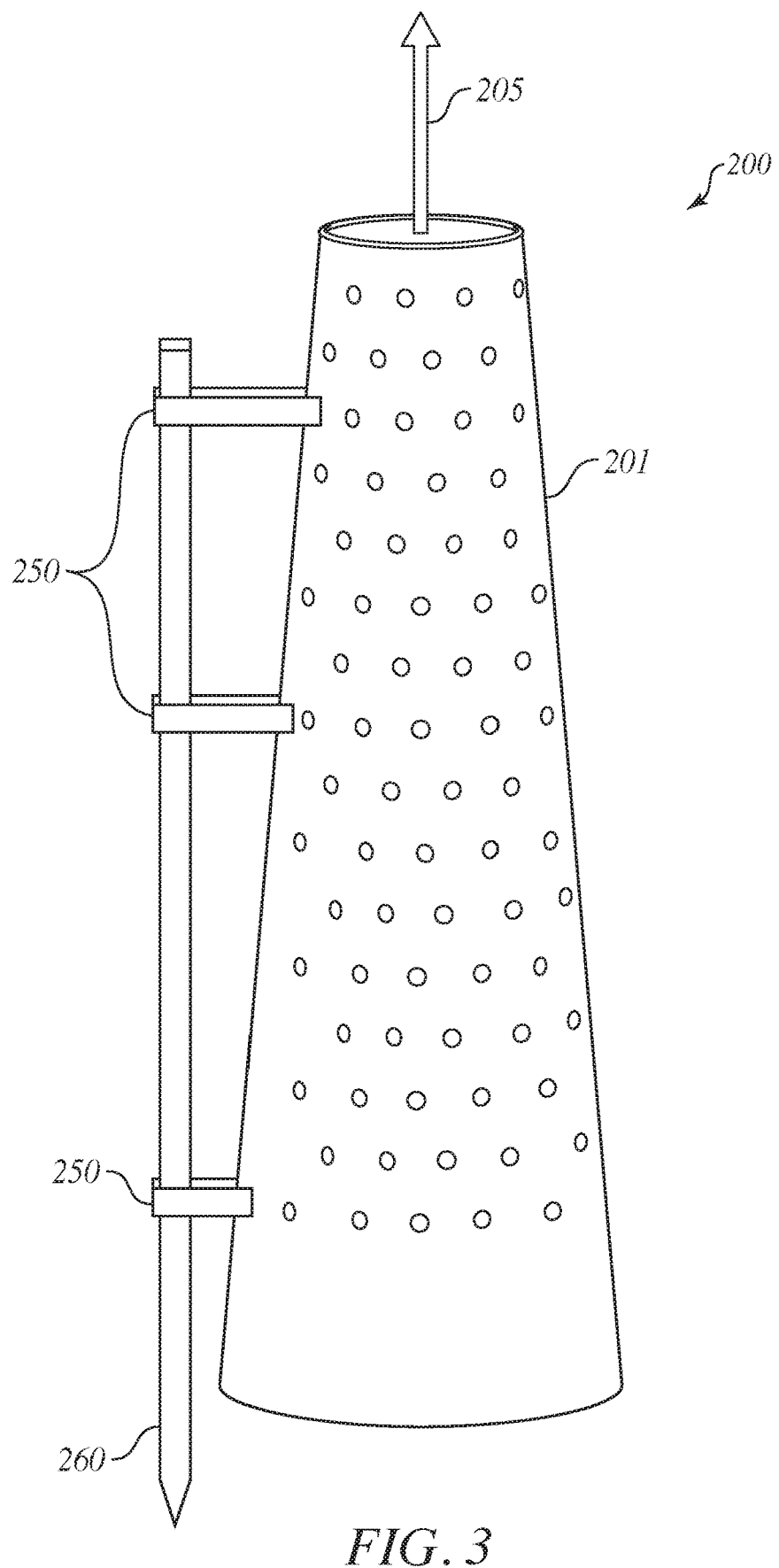
FIG. 3 is side view of a sapling protector having a support attached to the truncated cone-shaped metal tube; the support may be staked in the ground adjacent to the tube.

FIG. 3 illustrates an example of a sapling protector 200 according to the present invention where the truncated cone-shaped metal tube 201 of the sapling protector is attached via fasteners 250 to a support 260, which may have a direction parallel to the longitudinally extending axis 205 and which may be staked in the ground adjacent to the tube 201.

In the sapling protector of the present invention, the truncated cone-shaped metal tube has a coating on the outer surface of the metal sheet and the flexible metal sheet may include electrolytic tinplate and/or electrolytic chromium coated steel.

In non-limiting examples of the sapling protector according to the present invention, the electrolytic tinplate and/or electrolytic chromium coated steel has a nominal thickness of about 0.0061 inches to about 0.0118 inches.

Non limiting examples of the sapling protector include a metal sheet where the electrolytic tinplate and/or electrolytic chromium coated steel has a temper grade of T1 to DR9.

In non-limiting examples of the sapling protector according to the present invention, the truncated cone-shaped metal tube has a height of at least about 18". Alternatively and/or additionally, non-limiting examples of the sapling protector provide for a diameter of the opening of the first end is at least about 10" and a diameter of the opening of the second end is at least about 5".

Non-limiting example of the metal sapling grow tubes of the present invention are recyclable, ecofriendly, reusable, and safe alternative to plastic grow tubes. The sapling protector of the present invention may be prepared from a sheet of metal, for example, tin-free steel, which is perforated with staggered holes, spaced 2 inches apart. The machines used to manufacture the sapling protector of the present invention have the capability to cut specific shapes, create patterns or holes in the sheet metal, and bend the metal into a variety of orientations. The sheet of metal may be manipulated into a truncated cone shape and secured in that shape by a fastening mechanism. The fastening mechanism may be based on crimping patterns on the edges of the metal sheet. The bottom 6 inches of the cone may be such that it does not contain any holes and/or perforations to protect against potential herbivore and pesticide-induced damage. The sapling protector of the present is reusable over several growing seasons and recyclable should it be damaged in any way because it uses recyclable and/or reusable metal material whereas plastic growth tube are generally made of unrecyclable plastic materials that must be cut off or otherwise damaged in some way to remove them from the saplings. While tubular sapling protectors require the use of supporting stakes, the present truncated cone-shaped tube may be used as a free standing structure.

EXAMPLES

Example 1—Manufacturing Process

According to a non-limiting example of the sapling protector of the present invention, the truncated cone-shaped tree tube of the present invention may be a single piece of tin free steel with no added components. Rectangular sheets are cut from a master coil and are then cut into the shape of the cone. Perforations are added to the cone and then the edges are hemmed for safety. A coating with high solar emittance and reflectivity is then added to the outer surface of the cone. Table 1 provides details of the corresponding manufacturing process.

TABLE 1

| Assembly Name | Material Type | Raw Stock Size | Operations | Notes |
|---|---|---|---|---|
| Master Coil | 75#, T-2 BA, Tin Free Steel | 30-36" wide 15,000-20,000 lbs | Create rectangular sheets (blanks) by shearing to size using the Littell Shear | 1,2,3, 4,5 |
| Blank | Same | stock width × 25" long | Cut the shape of the tube from the rectangular blank | |
| Tube | Sae | 5" upper diameter 10" lower diameter 18" vertical height | Perforate the tube using the perforation scheme specified in Section 8.5 Hem all sides ≤ 1/4" Roll using the roll former | |
| Final | Henry Solar-Flex White coating | ~113 ml/tube | Apply coating to the outer surface of the tube | |

Notes:
1. 75# indicates a nominal thickness of .0083" + .0004"/ - .0006"
2. T-2 indicates hardness range of 50-56 on the Rockwell 30-T scale.
3. BA indicates the material was batch annealed.
4. Tin Free Steel indicates an Electrolytic Chromium Coated Sheet.
5. The width and weight of the master coil vary by shipment.

Example 2—Heat Transfer Analysis

In response to a potential concern with the use of tin free steel or other metal as the material for the sapling tube, which may overheat the sapling, a simple heat transfer analysis was performed. The cone is modeled by a thin-walled steel plate exposed to sunlight at 85 degrees Fahrenheit (21 degrees Celsius) experiencing wind of 0 mph. These assumptions correspond to the worst case scenario with the perforations, as this may be the equivalent of the holes having been blocked and the tree experiencing a warm summer day in California. The resulting calculations show that the temperatures will not exceed max growing conditions.

Example 3—Material and Material Selection Process

A tree tube according to the present invention was prepared from tin free steel coated with Henry 287 Solar-Flex White roof coating. The use of a bare metal tube was determined to not be adequate due to the corrosion and heat transmissibility to the interior of the tube of such bare metal tube. The use of a coating was thus employed in the present sapling protector to inhibit corrosion and to reflect sunlight away from the tube in order to control the temperature within the tube itself. More particularly, in a non-limiting example of the sapling protector of the present invention, Energy Saver roof coating products that are used to develop "cool roofs" were used. Such coating products allow the reflection of sunlight and minimize heat transmission to the interior of the tube on which such coating is applied. More particularly, these coating characteristics may reduce temperatures within the structure such as the tube of the present invention on which such a coating is applied, which in turn may reduce any possible additional costs or loss of plant related to the problems involving temperature control inside the sapling protector. Therefore, such a coating, which may be a heat-reflective and/or light-reflective and/or infra-red reflective coating, provides a desirable characteristic for the truncated cone-shaped tube of the present invention because the main concern with a metal product is that the material could potentially elevate temperatures within the tube. Example of such coatings may be Valspar's FLUROSPAR SR, Henry 287 Solar-Flex White roof coating, and/or any other similar coating. In particular, Henry 287 Solar-Flex White roof coating retains 60%+ initial reflectance, and resists mildew and corrosion. This product is available in 4.75 gallon jugs, one gallon being able to approximately cover 100 square feet of material, resulting in approximately 0.0297 gal of coating per sapling protector.

Example 4—Component and Component Selection Process

According to an example of sapling protector according to the present invention, a latching mechanism and/or one or more fasteners may be added to the truncated cone-shaped tube. A common problem with tree tubes or growth tubes is that bees and other larvae nest within the tubes. The presence of bees and other larvae attracts bears, raccoons, and other such wildlife who then attempt to pry open the tubes to get to the larvae. Accordingly, the addition of a mechanism and/or a fastener may be added to the tube of the present invention to physically hold the tube shut.

Three variations of latching mechanisms and/or fasteners were experimented upon. The first mechanism was a physical latch at the top and bottom of the tube. This type of mechanism would increase the manufacturing costs by increasing the steps involved in the manufacturing process. The second mechanism was an integrated latch that involved an extended piece of metal on one edge of the tube that slid into a slit into the opposing edge. The concern with this mechanism is the difficulty involved in eliminating sharp edges that would pose a safety hazard to the individuals installing the tubes. The third variation was to strategically place holes along the edges of the tube in order to the hold the two edges together with zip ties. Such a strategic placement of holes along the edges of the tube provided the best solution. Accordingly, the tube of the present invention may be perforated during the step that is already performed during the manufacturing process in order to add holes and/or perforations strategically positioned to allow fastening of the tube. Additionally and/or optionally, the tube of the present invention may be attached to one or more stakes in the field for structural support using zip ties, which may be attached to these holes and/or perforations, which would not require an excessive additional amount of work for a grower to zip tie the tube shut when there is already a process in place to zip tie the tube to a stake.

The present invention also provides for a corresponding method of protecting a tree sapling including the step of providing a flexible metal sheet, wherein the flexible metal sheet comprises electrolytic tinplate and/or electrolytic chromium coated steel, providing at least one fastener and fastening with the at least one fastener the first longitudinal edge of the sheet to the second longitudinal edge of the sheet to form a truncated cone-shaped metal tube.

This invention also provides a corresponding sapling protector kit for providing stable growth conditions to a sapling, which includes a flexible electrolytic tinplate and/or electrolytic chromium coated steel sheet, at least one fastener, and optionally a support, which may be stake to be inserted in the ground adjacent to the tube.

The present invention is also directed to the following clauses.

Clause 1: A sapling protector comprising: a truncated cone-shaped metal tube having a first and second ends and a longitudinally extending axis, wherein the truncated cone-shaped metal tube is open at both ends, wherein the diameter of the opening of the first end is larger than the diameter of the opening of the second end of the tube, and wherein the tube is formed from a flexible metal sheet, the metal sheet comprising a first and second transverse edges and a first and second longitudinal edges such that the metal sheet forms the truncated cone-shaped metal tube when the first longitudinal edge is joined to the second longitudinal edge; and at least one fastener securing the first and second longitudinal edges of the metal sheet to form the truncated cone-shaped tube, wherein the flexible metal sheet comprises electrolytic tinplate and/or electrolytic chromium coated steel; wherein the truncated cone-shaped metal tube comprises a plurality of perforations; wherein the truncated cone-shaped metal tube comprises a coating on the outer surface of the metal sheet; and wherein the longitudinal edges and transverse edges of the metal sheet are hemmed.

Clause 2: The sapling protector according to clause 1, wherein the electrolytic tinplate and/or electrolytic chromium coated steel has a nominal thickness of about 0.0061 inches to about 0.0118 inches.

Clause 3: The sapling protector according to clause 1 or 2, wherein the electrolytic tinplate and/or electrolytic chromium coated steel has a temper grade of T1 to DR9.

Clause 4: The sapling protector according to any of clause 1-3, wherein the plurality of perforations are located on an area of the truncated cone-shaped metal tube at least 6 inches above the first end of the tube.

Clause 5: The sapling protector according to any of clause 1-4, wherein the plurality of perforations comprises a plurality of rows of holes, wherein the row of holes are staggered along the longitudinally extending axis of the tube.

Clause 6: The sapling protector according to any of clause 1-5, wherein the coating is a heat-reflective coating.

Clause 7: The sapling protector according to any of clause 1-6, wherein the coating is a corrosion inhibitor coating.

Clause 8: The sapling protector according to any of clause 1-7, wherein the truncated cone-shaped metal tube has a height of at least about 18".

Clause 9: The sapling protector according to any of clause 1-8, wherein the diameter of the opening of the first end is at least about 10" and the diameter of the opening of the second end is at least about 5".

Clause 10: The sapling protector according to any of clause 1-9, further comprising a support attached to the truncated cone-shaped metal tube, wherein the support is staked in the ground adjacent to the tube.

Clause 11: A method for protecting a tree sapling comprising: providing a flexible metal sheet, wherein the flexible metal sheet comprises electrolytic tinplate and/or electrolytic chromium coated steel, wherein the metal sheet comprises a first and second transverse edges and a first and second longitudinal edges, and wherein the longitudinal edges and transverse edges of the metal sheet are hemmed; providing at least one fastener; and fastening with the at least one fastener the first longitudinal edge of the sheet to the second longitudinal edge of the sheet to form a truncated cone-shaped metal tube, wherein the truncated cone-shaped metal tube is open at both ends, wherein the diameter of the opening of the first end is larger than the diameter of the opening of the second end of the tube, wherein the truncated cone-shaped metal tube comprises a plurality of perforations, and wherein the truncated cone-shaped metal tube comprises a coating on the outer surface of the metal sheet.

Clause 12: The method according to clause 11, wherein the electrolytic tinplate and/or electrolytic chromium coated steel has a nominal thickness of about 0.0061 inches to about 0.0118 inches.

Clause 13: The method according to clause 11 or 12, wherein the electrolytic tinplate and/or electrolytic chromium coated steel has a temper grade of T1 to DR9.

Clause 14: The method according to any of clause 11-13, wherein the plurality of perforations are located on an area of the truncated cone-shaped metal tube at least 6 inches above the first end of the tube.

Clause 15: A sapling protector kit for providing stable growth conditions to a sapling, the kit comprises: a flexible electrolytic tinplate and/or electrolytic chromium coated steel sheet having a first and second transverse hemmed edges and a first and second longitudinal hemmed edges; at least one fastener to fasten the first longitudinal hemmed edge of the sheet to the second longitudinal hemmed edge of the sheet to form a truncated cone-shaped metal tube; and optionally a support, wherein the truncated cone-shaped metal tube is open at both ends, wherein the diameter of the opening of the first end is larger than the diameter of the opening of the second end of the tube, wherein the truncated cone-shaped metal tube comprises a plurality of perforations to provide airflow and light to the sapling, and wherein the truncated cone-shaped metal tube comprises a coating on the outer surface of the metal sheet.

Clause 16: The sapling protector kit according to clause 15, wherein the plurality of perforations comprises a plurality of rows of holes, wherein the row of holes are staggered along the longitudinally extending axis of the tube.

Clause 17: The sapling protector kit according to clause 15 or 16, wherein the electrolytic tinplate and/or electrolytic chromium coated steel has a temper grade of T1 to DR9.

Clause 18: The sapling protector kit according to any of clause 15-17, wherein the electrolytic tinplate and/or electrolytic chromium coated steel has a nominal thickness of about 0.0061 inches to about 0.0118 inches.

Clause 19: The sapling protector kit according to any of clause 15-18, wherein the coating is a heat-reflective coating.

Clause 20: The sapling protector kit according to any of clause 15-19, wherein the at least one fastener comprises a plastic zip tie.

Various changes could be made in the above descriptions, methods and examples without departing from the scope of the invention as defined in the claims below. It is intended that all matter contained in the above description including that as shown in the accompanying drawings, shall be interpreted as illustrative and not as a limitation.

We claim:

1. A sapling protector comprising:
   a) a truncated cone-shaped metal tube having first and second ends and a longitudinally extending axis,
      wherein the truncated cone-shaped metal tube is open at both ends,
      wherein the diameter of the opening of the first end is larger than the diameter of the opening of the second end, and
      wherein the truncated cone-shaped metal tube is formed from a flexible metal sheet, the flexible metal sheet comprising first and second transverse edges and first and second longitudinal edges such that the flexible metal sheet forms the truncated cone-shaped metal tube when the first longitudinal edge is joined to the second longitudinal edge, the first transverse edge defining the diameter of the opening of the first end; and
   b) at least one fastener securing the first and second longitudinal edges of the metal sheet to form the truncated cone-shaped tube, wherein the flexible metal sheet comprises at least one of electrolytic tinplate or electrolytic chromium coated steel, wherein the truncated cone-shaped metal tube comprises a first region having no perforations and extending at least 15.24 cm (6 inches) from the first transverse edge and a second region extending from the first region to the second transverse edge and comprising a plurality of perforations, and wherein the longitudinal edges and transverse edges of the metal sheet are hemmed; and c) a support oriented parallel to the longitudinally extending axis and attached to the truncated cone-shaped metal tube by a plurality of support fasteners, wherein a length of each support fastener varies along the longitudinally extending axis, and a lower most support fastener of the plurality of support fasteners is attached to a first row of the plurality of perforations following the first region.

2. The sapling protector according to claim 1, wherein the flexible metal sheet has a nominal thickness of about 0.15 cm (0.0061 inches) to about 0.030 cm (0.0118 inches).

3. The sapling protector according to claim 1, wherein the flexible metal sheet has a temper grade of T1 to DR9.

4. The sapling protector according to claim 1, wherein the flexible metal sheet comprises a heat reflective coating.

5. The sapling protector according to claim 1, wherein the truncated cone-shaped metal tube has a height of at least about 45.72 cm (18 inches).

6. The sapling protector according to claim 1, wherein the diameter of the opening of the first end is at least about 25.4 cm (10 inches) and the diameter of the opening of the second end is at least about 12.7 cm (5 inches).

7. The sapling protector of claim 1, wherein the at least one fastener is inserted through at least one of the plurality of perforations near each of the first longitudinal edge and the second longitudinal edge.

8. The sapling protector of claim 1, wherein the length of each of the support fasteners connecting the support to the protector is inversely proportional to the distance from the first end.

9. The sapling protector of claim 1, wherein the length of the plurality of support fasteners is shorter at the first end as compared to the second end.

10. The sapling protector of claim 1, wherein each support fastener is a rectangular band.

11. The sapling protector of claim 1, wherein the plurality of support fasteners comprise at least two opposing support fasteners on each side of the support.

12. A method for protecting a tree sapling comprising:
a) providing a flexible metal sheet comprising at least one of electrolytic tinplate or electrolytic chromium coated steel, wherein the flexible metal sheet comprises first and second transverse edges and first and second longitudinal edges, and wherein the longitudinal edges and transverse edges of the flexible metal sheet are hemmed;
b) fastening the first longitudinal edge to the second longitudinal edge with at least one fastener to form a truncated cone-shaped metal tube having a longitudinally extending axis; and
c) fastening the truncated cone-shaped metal tube to a support oriented parallel to the longitudinally extending axis using a plurality of support fasteners, wherein a length of each support fastener varies along the longitudinally extending axis, wherein the truncated cone-shaped metal tube is open at both ends, wherein the diameter of the opening of the first end is larger than the diameter of the opening of the second end and the first transverse edge defines the diameter of the opening of the first end, and wherein the truncated cone-shaped metal tube comprises a first region having no perforations and extending at least 15.24 cm (6 inches) from the first transverse edge and a second region extending from the first region to the second transverse edge and comprising a plurality of perforations, and wherein a lower most support fastener of the plurality of support fasteners is attached to a first row of the plurality of perforations following the first region.

13. The method according to claim 12, wherein the flexible metal sheet has a nominal thickness of about 0.15 cm (0.0061 inches) to about 0.030 cm (0.0118 inches).

14. The method according to claim 12, wherein the flexible metal sheet has a temper grade of T1 to DR9.

15. A sapling protector kit for providing stable growth conditions to a sapling, the kit comprises:
a) a flexible metal sheet formed from at least one of electrolytic tinplate or electrolytic chromium coated steel sheet and having first and second transverse hemmed edges and first and second longitudinal hemmed edges;
b) at least one fastener to fasten the first longitudinal hemmed edge to the second longitudinal hemmed edge to form a truncated cone-shaped metal tube;
c) optionally a support; and
d) a plurality of support fasteners having varied lengths to fasten the truncated cone-shape metal tube to the support oriented parallel to a longitudinally extending axis of the truncated cone-shape metal tube, wherein the truncated cone-shaped metal tube is open at both ends, wherein the diameter of the opening of the first end is larger than the diameter of the opening of the second end and the first transverse edge defines the diameter of the opening of the first end, and wherein the truncated cone-shaped metal tube comprises a first region having no perforations and extending at least 15.24 cm (6 inches) from the first transverse edge and a second region extending from the first region to the second transverse edge and comprising a plurality of perforations to provide airflow and light to the sapling, and wherein a lower most support fastener of the plurality of support fasteners is attached to a first row of the plurality of perforations following the first region.

16. The sapling protector kit according to claim 15, wherein the flexible metal sheet has a temper grade of T1 to DR9.

17. The sapling protector kit according to claim 15, wherein the flexible metal sheet has a nominal thickness of about 0.15 cm (0.0061 inches) to about 0.030 cm (0.0118 inches).

18. The sapling protector kit according to claim 15, wherein the flexible metal sheet comprises a heat reflective coating.

19. The sapling protector kit according to claim 15, wherein the at least one fastener comprises a plastic zip tie.

* * * * *